No. 803,252. PATENTED OCT. 31, 1905.
N. W. STORER.
TROLLEY FOR ELECTRICALLY PROPELLED VEHICLES.
APPLICATION FILED FEB. 15, 1905.
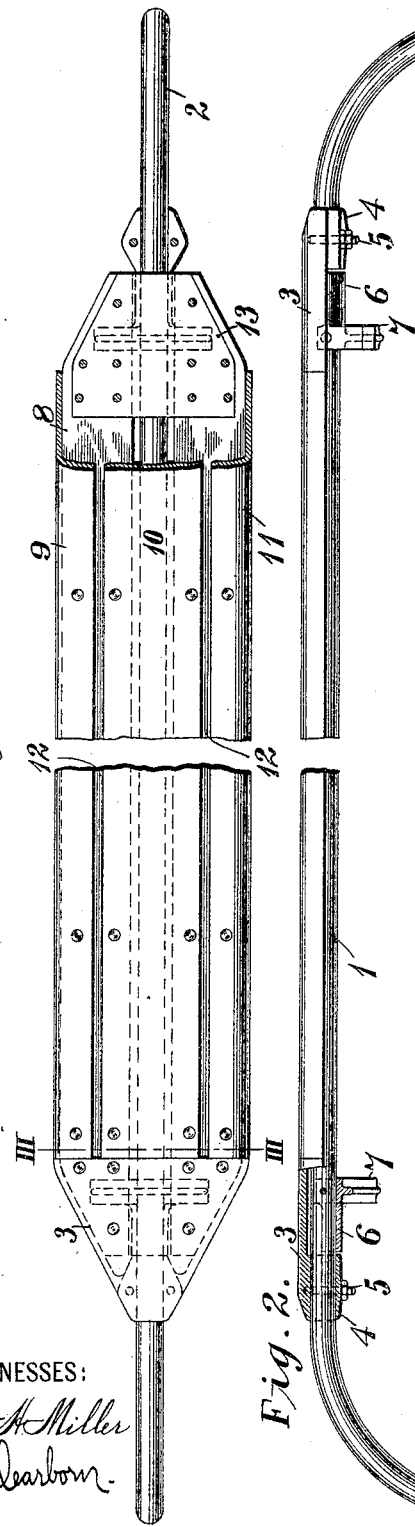
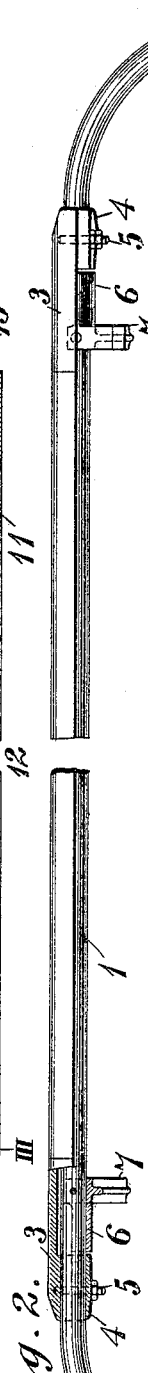
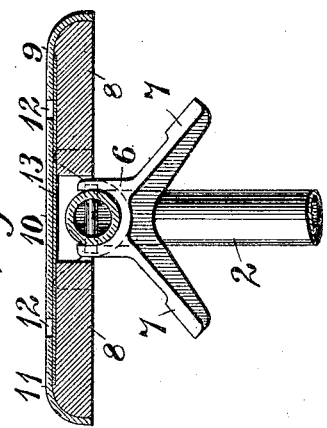
WITNESSES:
Fred H. Miller
R. J. Dearborn
INVENTOR
Norman W. Storer
BY
Wesley G. Carr
ATTORNEY

UNITED STATES PATENT OFFICE.

NORMAN W. STORER, OF PITTSBURG, PENNSYLVANIA, ASSIGNOR TO WESTINGHOUSE ELECTRIC & MANUFACTURING COMPANY, A CORPORATION OF PENNSYLVANIA.

TROLLEY FOR ELECTRICALLY-PROPELLED VEHICLES.

No. 803,252. Specification of Letters Patent. Patented Oct. 31, 1905.

Application filed February 15, 1905. Serial No. 245,678.

*To all whom it may concern:*

Be it known that I, NORMAN W. STORER, a citizen of the United States, and a resident of Pittsburg, in the county of Allegheny and State of Pennsylvania, have invented a new and useful Improvement in Trolleys for Electrically-Propelled Vehicles, of which the following is a specification.

My invention relates to trolleys for electrically-propelled vehicles; and it has for its object to provide a device of this character which shall be specially adapted for high-speed service in connection with trolley-conductors supplied with high voltage.

In the accompanying drawings, Figure 1 is a plan view of the contact portion of the trolley, a part of one end being broken away. Fig. 2 is a view mainly in end elevation, but partially in section, of the device shown in Fig. 1; and Fig. 3 is a cross-sectional view taken on line III III of Fig. 1.

Satisfactory utilization of high-voltage alternating-current energy for the propulsion of railway-vehicles at high speeds necessitates the employment of special devices for making connection between the vehicle-motors and the supply-conductors, the ordinary wheel-trolley being generally inappropriate for such service. Various forms of sliding contact devices have been proposed for use in lieu of the ordinary wheel-trolley; but the excessive wear of the contact parts of such devices and the limited area of the contact between them and the trolley-conductor have in most cases rendered them more or less inefficient in service. I have accordingly devised the contact structure which will be now described and which has been found admirably adapted for high-voltage and high-speed service, in which connection it will be generally used, though I desire it to be understood that it need not necessarily be limited to such use.

The trolley head or bow 1 is mounted upon the free end of a hinged or pivoted pole or frame or upon any suitable structure which may be raised or extended to bring the contact portion of the trolley into engagement with the trolley-conductor and to lower it out of engagement when desired, and as such supporting means constitutes no part of my present invention I have omitted illustration of the same.

The trolley-head 1 is of bow shape and may be designated as the "trolley-bow." This comprises a substantially triangular shaped frame 2, here shown as formed of tubing, though it may be made from a solid rod, if desired. The outer ends of the straight horizontal portion of the tube 2 are provided with approximately V-shaped plates 3, to the outer ends of which are clamped blocks 4 by means of suitable screws or bolts 5, the outer ends of the parts 3 and the corresponding blocks 4 constituting sleeves which surround the tube 2 and are free to turn thereon. Securely riveted or otherwise fastened to the tube 2 adjacent to the inner ends of the blocks 4 are blocks 6, which are provided with downwardly and outwardly extending arms 7, that constitute stops, the specific use of which will be hereinafter more fully described.

Riveted or otherwise fastened to the plates 3 are the ends of longitudinal bars 8 of wood or other suitable material, which have curved outer edges, and removably fastened to these bars 8 are three conducting-strips 9, 10, and 11, preferably formed of aluminium or soft copper, the middle strip 10 being separated from the side strips 9 and 11 by spaces 12, that are filled with a suitable solid or semiliquid lubricant. Securely fastened to the ends of the bars 8 and also to the plates 3 are conducting-plates 13. The ends of the strips 9, 10, and 11 are removably fastened to the plates 13 and are thereby electrically connected to the plates 3 and through them to the frame or bow 2.

Since the contact portion of the trolley-bow, comprising the plates 3, 9, 10, and 11, are connected by the bars 8 and the structure thus formed is so mounted as to turn freely on the supporting rod or tube 2, the bow will always have a wide contact-surface in engagement with the trolley-conductor and the structure will tilt readily to adapt itself easily to any inequalities in the conductor as regards general elevation above the track or variations from uniform surface, and when the bow is lowered the contact member is prevented by the stop-arms 7 from turning so far in either direction that it will not properly engage the trolley-conductor when the bow is again elevated. The lubricant with which the device is provided and the large contact area tend to reduce the wear and prevent sparking, and the structural details facilitate renewal of the contact-strips when necessary.

The arrangement of grooves between the contact strips or plates is such as to insure retention of the lubricant in position to serve its purpose effectively, and the materials of which the device is constructed, as well as the form of the several parts, insure light weight and comparatively low cost.

Variations in the form and arrangement of parts may be made without departing from my invention, and I therefore desire to disclaim all limitations, except such as may be imposed by the prior art.

I claim as my invention—

1. A trolley-bow having a contact member provided with a wide, flat contact-surface and with one or more lubricant-containing grooves.

2. A trolley-bow having a contact member comprising a plurality of sheet-metal contact-strips that are arranged to make flatwise contact and are spaced apart to form one or more lubricant-containing grooves between adjacent edges.

3. A trolley-bow having a contact member comprising a plurality of sheet-metal contact-strips and a supporting-frame upon which said strips are mounted flatwise and are so spaced apart as to provide one or more lubricant-containing grooves between adjacent edges.

4. A trolley-bow comprising a frame having a substantially horizontal portion, an elongated and laterally-expanded contact member pivotally mounted upon said horizontal frame portion and limiting-stops for said contact member.

5. In a trolley for electric railways, a bow-frame having substantially horizontal cylindrical portions and a contact member movably mounted upon said cylindrical portions and comprising a frame, and sheet-metal strips fastened thereto and spaced apart to form grooves to receive a lubricant.

6. In a trolley for electric railways, a bow-frame having a substantially horizonal portion, stop-arms projecting outwardly and downwardly therefrom, a contact member pivotally supported on said horizontal frame portion and having a wide, flat contact-surface provided with a groove or grooves for lubricant.

7. A trolley-bow comprising a frame having a broad upper surface and a plurality of removable contact-strips.

8. A trolley-bow comprising a tilting frame and a plurality of removable contact-strips.

9. A trolley for electric-railway vehicles comprising a bow-frame having substantially horizontal, cylindrical portions, and a contact member mounted thereon that comprises a frame or body portion and sheet-metal strips removably fastened thereto.

10. A trolley for electric-railway vehicles comprising a bow-frame having substantially horizontal bearing portions and laterally-projecting stop-arms, and a contact member that is so mounted upon said bearing portions as to be rotatively movable within the limits permitted by said stop-arms.

11. A trolley for electric-railway vehicles comprising a bow-frame having substantially horizontal bearing portions and laterally-projecting stop-arms, and a contact member that is so mounted upon said bearing portions as to be rotatively movable within the limits permitted by said stop-arms and is provided with removable sheet-metal contact-strips.

12. A trolley for electric-railway vehicles comprising a bow-frame having substantially horizontal bearing portions and laterally-projecting stop-arms, and a contact member that is so mounted upon said bearing portions as to be rotatively movable within the limits permitted by said stop-arms and is provided with removable sheet-metal contact-strips which are spaced apart to provide lubricant-containing grooves.

In testimony whereof I have hereunto subscribed my name this 7th day of February, 1905.

NORMAN W. STORER.

Witnesses:
 THEODORE VARNEY,
 BIRNEY HINES.